(12) United States Patent
Bolla et al.

(10) Patent No.: US 8,494,318 B2
(45) Date of Patent: Jul. 23, 2013

(54) METHOD AND DEVICE FOR HITLESS TUNABLE OPTICAL FILTERING

(75) Inventors: Lorenzo Bolla, Verona (IT); Paola Galli, Adro (IT); Silvia Ghidini, Magenta (IT); Giorgio Grasso, Monza (IT); Marco Romagnoli, Milan (IT); Luciano Socci, Milan (IT)

(73) Assignee: Google Inc., Mountain View, CA (US)

( * ) Notice: Subject to any disclaimer, the term of this patent is extended or adjusted under 35 U.S.C. 154(b) by 777 days.

(21) Appl. No.: 12/513,993

(22) PCT Filed: Nov. 9, 2006

(86) PCT No.: PCT/EP2006/010722
§ 371 (c)(1),
(2), (4) Date: Apr. 7, 2010

(87) PCT Pub. No.: WO2008/055527
PCT Pub. Date: May 15, 2008

(65) Prior Publication Data
US 2010/0183312 A1     Jul. 22, 2010

(51) Int. Cl.
*G02B 6/42* (2006.01)
*H04J 14/02* (2006.01)

(52) U.S. Cl.
USPC .................................. 385/32; 398/85; 385/27

(58) Field of Classification Search
USPC .............................................. 385/32; 398/85
See application file for complete search history.

(56) References Cited

U.S. PATENT DOCUMENTS

| | | | |
|---|---|---|---|
| 6,101,300 A | 8/2000 | Fan et al. | |
| 6,512,866 B1 * | 1/2003 | Fan et al. | 385/27 |
| 6,580,851 B1 | 6/2003 | Vahala et al. | |
| 6,839,482 B2 * | 1/2005 | Margalit | 385/27 |
| 6,891,998 B2 * | 5/2005 | Jones | 385/30 |
| 7,065,276 B2 * | 6/2006 | Scheuer et al. | 385/50 |
| 7,187,827 B2 * | 3/2007 | Montgomery et al. | 385/39 |
| 7,231,113 B2 * | 6/2007 | Chu et al. | 385/30 |

(Continued)

FOREIGN PATENT DOCUMENTS

WO        03/081324 A1     10/2003

OTHER PUBLICATIONS

Yamagata, S. et al., "Non-blocking wavelength channel switch using TO effect of doubles series coupled microring resonator", Electronics Letters, May 12, 2005, vol. 41, No. 10, 3 pages.

(Continued)

*Primary Examiner* — Charlie Peng
(74) *Attorney, Agent, or Firm* — Honigman Miller Schwartz and Cohn LLP (57) ABSTRACT

A method of filtering an optical signal includes operating an optical filter having resonators, each having a respective free spectral range and a respective resonance falling within a first frequency band, first tuning at least one resonator with respect to at least another resonator to obtain a separation between any resonance of at least one resonator falling within an optical bandwidth with respect to a resonance of at least another resonator nearest to the any resonance, second tuning all the resonators of the optical filter so as to move all respective resonances by a respective frequency interval greater than a frequency spacing, and third tuning the at least one resonator and the at least another resonator such that a further respective resonance of each one of the resonators falls within a second frequency band, different from the first frequency band.

20 Claims, 9 Drawing Sheets

U.S. PATENT DOCUMENTS

| | | | | |
|---|---|---|---|---|
| 7,292,751 | B2 * | 11/2007 | Popovic | 385/32 |
| 7,343,067 | B2 * | 3/2008 | Barwicz et al. | 385/32 |
| 7,421,168 | B1 * | 9/2008 | Goutzoulis | 385/50 |
| 7,502,532 | B2 * | 3/2009 | McCallion et al. | 385/27 |
| 7,853,108 | B2 * | 12/2010 | Popovic et al. | 385/126 |
| 8,032,027 | B2 * | 10/2011 | Popovic | 398/82 |
| 8,068,706 | B2 * | 11/2011 | Popovic et al. | 385/28 |
| 8,095,010 | B2 * | 1/2012 | Socci et al. | 398/85 |
| 8,139,904 | B2 * | 3/2012 | Green et al. | 385/5 |
| 2002/0118923 | A1 | 8/2002 | Wang et al. | |
| 2003/0174946 | A1 | 9/2003 | Viens | |
| 2006/0051010 | A1 * | 3/2006 | Chu et al. | 385/5 |
| 2008/0273835 | A1 * | 11/2008 | Popovic | 385/27 |
| 2009/0220228 | A1 * | 9/2009 | Popovic | 398/48 |
| 2010/0303122 | A1 * | 12/2010 | Popovic | 372/92 |

OTHER PUBLICATIONS

Goebuchi, Yuta et al., "Fast and Stable Wavelength-Selective Switch Using Double-Series Coupled Dielectric Microring Resonator", IEEE Photonics Technology Letters, vol. 18, No. 3, Feb. 1, 2006, pp. 538-540.

Shani, Yosi et al., "Integrated Optic Adiabatic Devices on Silicon", IEEE Journal of Quantum Electronics, vol. 27, No. 3, Mar. 1991, pp. 556-566.

Hohlfeld, Dennis et al., "An all-dielectric tunable optical filter based on the thermo-optic effect", Journal of Optics. A, Pure and Applied Optics, Institute of Physics Publishing, Bristol,, GB, vol. 6, No. 6, Jun. 1, 2004, pp. 504-511, XP020081456, ISSN: 1464-4258.

* cited by examiner

METHOD AND DEVICE FOR HITLESS TUNABLE OPTICAL FILTERING

FIELD OF THE INVENTION

The present invention relates to the field of optical communication systems including hitless tunable optical filtering functionality, such as hitless tunable optical add and/or drop functionality.

BACKGROUND OF THE INVENTION

A common technique to increase the transmission capacity of today optical communication systems is wavelength division multiplexing (WDM), wherein a plurality of optical channels, each having a respective optical frequency (and correspondingly respective optical wavelength), are multiplexed together in a single optical medium, such as for example an optical fiber. The optical frequencies allocated for the WDM channels are typically arranged in a grid having an equal spacing between two adjacent frequencies. In dense WDM (DWDM), wherein the WDM channels may be closely spaced, the frequency spacing is typically equal to about 100 GHz (corresponding to a wavelength spacing of about 0.8 nm in the near infrared band—roughly between 1 µm to 2 µm) or about 50 GHz (about 0.4 nm in wavelength). Other used WDM channel separations are 200 GHz, 33.3 GHz and 25 GHz. Typically, the set of allocated optical frequencies occupies an optical bandwidth of about 4 THz, which gives room for the use of up to 40 or 41 WDM channels having 100 GHz spacing. The device of the present invention is suitable for a WDM optical bandwidth of at least about 1 THz, preferably at least about 2 THz, typically placed around 1550 nm.

Optical networking is expected to be widely used in perspective optical communication field. The term 'optical network' is commonly referred to an optical system including a plurality of point-to-point or point-to-multipoint (e.g., metroring) optical systems optically interconnected through nodes. In all-optical transparent networks few or no conversions of the optical signal into electrical signal, and then again in optical signal, occur along the whole path from a departure location to a destination location. This is accomplished by placing at the nodes of the optical networks electro-optical or optical devices which are apt to process the optical signal in the optical domain, with limited or no need for electrical conversion. Examples of such devices are optical add and/or drop multiplexers (OADM), branching units, optical routers, optical switches, optical regenerators (re-shapers and/or re-timers) and the like. Accordingly, the term 'optical filtering' or 'optical processing', for the purpose of the present description is used to indicate any optical transformation given to an optical radiation, such as extracting a channel or a power portion of said channel from a set of WDM channels ('dropping'), inserting a channel or a power portion of said channel into a WDM signal ('adding'), routing or switching a channel or its power portion on a dynamically selectable optical route, optical signal reshaping, retiming or a combination thereof. In addition, optical systems, and at a greater extent optical networks, make use of optical amplifiers in order to compensate the power losses due to fiber attenuation or to insertion losses of the optical devices along the path, avoiding the use of any conversion of the optical signal into the electrical domain even for long traveling distances and/or many optical devices along the path. In case of DWDM wavelengths, all channels are typically optically amplified together, e.g. within a bandwidth of about 32 nm around 1550 nm.

In optical systems, and at a greater extent in optical networks, a problem exists of filtering one or more optical channels at the nodes while minimizing the loss and/or the distortion of the filtered optical channel(s), as well the loss and/or the distortion of the optical channels transmitted through the node ideally without being processed (hereinafter referred to as 'thru' channels). Advantageously, the optical processing node should be able to simultaneously process more than one channel, each one arbitrarily selectable independently from the other processed channels. Ideally up to all the channels may be simultaneously selectable to be processed, but in practice a number between 2 and 16, preferably between 4 and 8, is considered to be sufficient for the purpose.

It is desirable that the optical processing node is tunable or reconfigurable, i.e., it can change dynamically the subset of channels on which it operates. In order to be suitable to arbitrarily select the channel to be processed within the whole WDM optical bandwidth, the tuning range of the whole optical processing node should be at least equal to said optical bandwidth.

It is also preferred that while the processing node "moves" from an initial channel (A) to a destination channel (B), the channels different from A and B remain unaffected by the tuning operation. In this case the component is defined as 'hitless'. In particular, the channels placed between the initially processed channel and the final channel after tuning should not be subject to an additional impairment penalty, called 'hit', by the tuning operation. The hit may include a loss penalty and/or an optical distortion such as phase distortion and/or chromatic dispersion.

For example, optical communication networks need provisions for partially altering the traffic at each node by adding and/or dropping one or several independent channels out of the total number. Typically, an OADM node removes from a WDM signal a subset of the transmitted channels (each corresponding to one frequency/wavelength), and adds the same subset with a new information content, said subset being dynamically selectable.

There are several additional concerns. The tunable optical processing node should not act as a narrow band filter for the unprocessed channels, since concatenation of such nodes would excessively narrow the channel pass bands. The tunable optical processing node should also be ultra-compact and should have low transmission loss and low cost, since these important factors ultimately determine which technology is selected.

In article "Non-blocking wavelength channel switch using TO effect of double series coupled microring resonator", S. Yamagata et al., El. Lett. $12^{th}$ May 2005, Vol. 41, No. 10, it is demonstrated a non-blocking tunable filter using the thermo-optic (TO) effect of a double series coupled polymer microring resonator by controlling individual resonant wavelengths.

In article "Fast and stable wavelength-selective switch using double-series coupled dielectric microring resonator", Y. Goebuchi et al., IEEE Phot. Tech. Lett., Vol. 18, No. 3, Feb. 1, 2006, it is demonstrated a hitless tunable add-drop filter using the thermo-optic effect of double series coupled dielectric microring resonator.

SUMMARY OF THE INVENTION

The Applicant has found that there is a need for an optical communication system having tunable optical processing functionality which leaves unaltered, or at least reduces the alteration of, the thru channels during tuning, i.e. it should be hitless. In addition, the optical processing node should preferably be low-loss, low-cost, fast tunable and/or broadband.

The Applicant has noted that the filter devices described in the above cited articles are not optimally designed and/or operated for changing (tuning) the filtered optical channel from an initial channel to a final one, both the channels being arbitrarily selectable over a WDM grid occupying a large optical band (of at least 1 THz), while keeping at zero or low level the power and/or dispersion hit on the thru channels during the tuning (placed in between the initial and final channel and/or outside the spectral region spanning from the initial to the final channel).

Moreover, the Applicant has faced the problem of reducing the power consumption of the optical filter while being tuned and/or operated for filtering.

The Applicant has found a method and a system for optical transmission provided with tunable optical processing functionality which can solve one or more of the problems stated above. The solution of the present invention is simple, feasible and low cost.

In an aspect of the present invention, a method for filtering an optical signal is provided.

The applicant believes that, during tuning of an optical filter comprising a plurality of resonators, the tuning of the ensemble of resonators over a frequency span of at least one frequency spacing while at least two resonators have respective nearest resonances mismatched by at least 150 GHz, allows achieving 'hitless' or low hit tuning of the overall filter over a wide frequency band (at least 1 THz). Advantageous embodiments of this method are provided. In particular, limiting the mismatch of the respective nearest resonances of the at least two resonators to at most 1000 GHz allows feasibility of wide tuning, ease of operation and reduced power consumption.

According to another aspect of the present invention, an optical device for filtering an optical signal is provided. Advantageous embodiments of this aspect are provided.

According to a further aspect of the present invention, an optical communication system comprises a transmitter, a receiver, an optical line optically connecting the transmitter and the receiver and an optical device according to the above and coupled along the optical line.

In an embodiment of the various aspects of the invention, all the resonators of the optical filter have the same free spectral range.

In an embodiment of the various aspects of the invention, the plurality of resonators of the optical filter comprises two and no more than two resonators.

In an embodiment of the various aspects of the invention, said separation in step b) and said distance in step c) both are greater than or equal to 200 GHz, preferably greater than or equal to 300 GHz.

In an embodiment of the various aspects of the invention, said separation in step b) and said distance in step c) both are less than or equal to 800 GHz, preferably less than or equal to 600 GHz.

In an embodiment of the various aspects of the invention, the frequency spacing is greater than or equal to 50 GHz, preferably greater or equal to 100 GHz or greater or equal to 200 GHz.

In an embodiment of the various aspects of the invention, a distance between a central frequency of the first frequency band and a central frequency of the second frequency band is greater than or equal to about 1 THz.

BRIEF DESCRIPTION OF THE DRAWINGS

The features and advantages of the present invention will be made clear by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
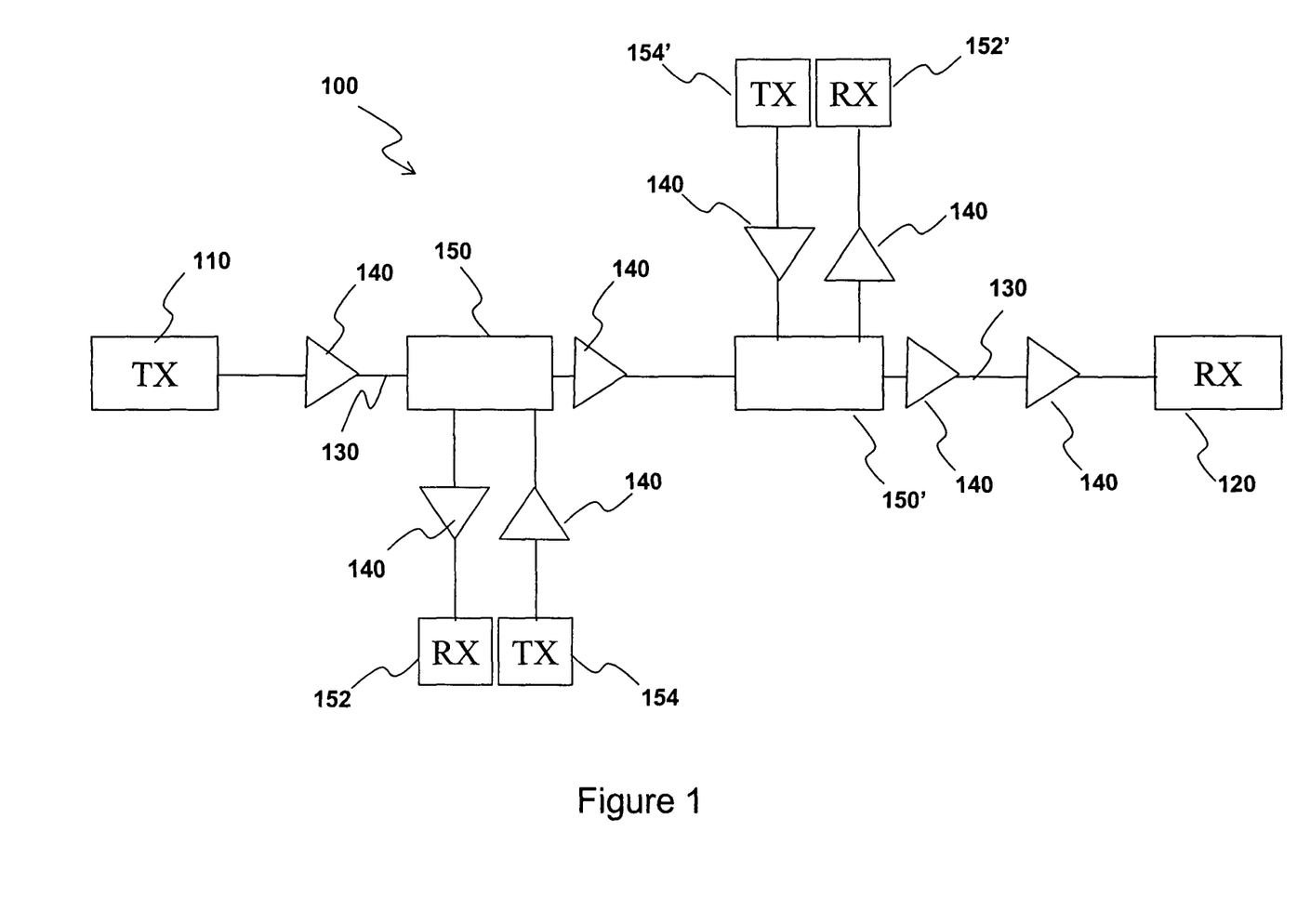
FIG. 1 schematically shows in terms of functional blocks an exemplary optical communication system architecture according to the present invention.

FIG. 1 shows an optical communication system architecture according to a possible embodiment of the present invention.

The optical communication system 100 comprises at least a transmitter 110, a receiver 120 and an optical line 130 which optically connects the transmitter and the receiver. The transmitter 110 is an opto-electronic device apt to emit an optical signal carrying information. It typically comprises at least an optical source (e.g., a laser) apt to emit an optical radiation and at least a modulator apt to encode information onto the optical radiation. Preferably, the transmitter 110 is a WDM transmitter (e.g., a DWDM transmitter) and the optical signal may comprise a plurality of optical channels (each carrying modulation-encoded information) having respective optical frequencies equally spaced by a given frequency spacing and occupying an optical bandwidth. Preferably, said optical signal lies in the near-infrared wavelength range, e.g. from 900 nm to 1700 nm. Preferably said optical bandwidth is at least 1 THz, more preferably it is at least 2 THz, still more preferably it is at least 3 THz, such as for example equal to about 4 THz (e.g. from about 1530 to about 1560 nm, called C-band). The receiver 120 is a corresponding opto-electronic device apt to receive the optical signal emitted by the transmitter and to decode the carried information. The optical line 130 may be formed by a plurality of sections of optical transmission media, such as for example optical fiber sections, preferably cabled. Between two adjacent sections of optical fiber, an optical or opto-electronic device is typically placed, such as for example a fiber splice or a connector, a jumper, a planar lightguide circuit, a variable optical attenuator or the like.

For adding flexibility to the system 100 and improving system functionality, one or a plurality of optical, electronic or opto-electronic devices may be placed along the line 130. In FIG. 1 a plurality of optical amplifiers 140 are exemplarily shown, which may be line-amplifiers, optical boosters or pre-amplifiers.

According to the present invention, the optical system 100 comprises at least one optical processing node (OPN) 150 optically coupled to the optical line 130 and apt to filter or route or add or drop or regenerate, fully or partially, at least one optical channel of the WDM optical signal propagating through the optical line 130. The OPN is preferably dynamically tunable or reconfigurable. In the particular case wherein the optical processing node 150 is an optical add and/or drop node 150, as shown in FIG. 1, i.e., a node adapted to route or switch or add and/or drop the optical signal, the routed or switched or dropped or added channel(s) may be received or transmitted by further receiver(s) 152 or transmitter(s) 154, respectively, which may be co-located with the OPN node or at a distance thereof. The optical system or network 100 may advantageously comprise a plurality of optical processing nodes. In FIG. 1 a further optical processing node 150' is exemplarily shown, together with its respective optional transmitting and receiving devices 152' and 154'.

An optical system 100 having optical add and/or drop nodes 150, as shown in FIG. 1, is commonly referred to as an optical network and it is characterized by having a plurality of possible optical paths for the optical signals propagating through it. As exemplarily shown in FIG. 1, a number of six optical paths are in principle possible, which corresponds to all possible choices of the transmitter-receiver pairs in FIG. 1 (excluding the pairs belonging to the same node).

Figure 2:
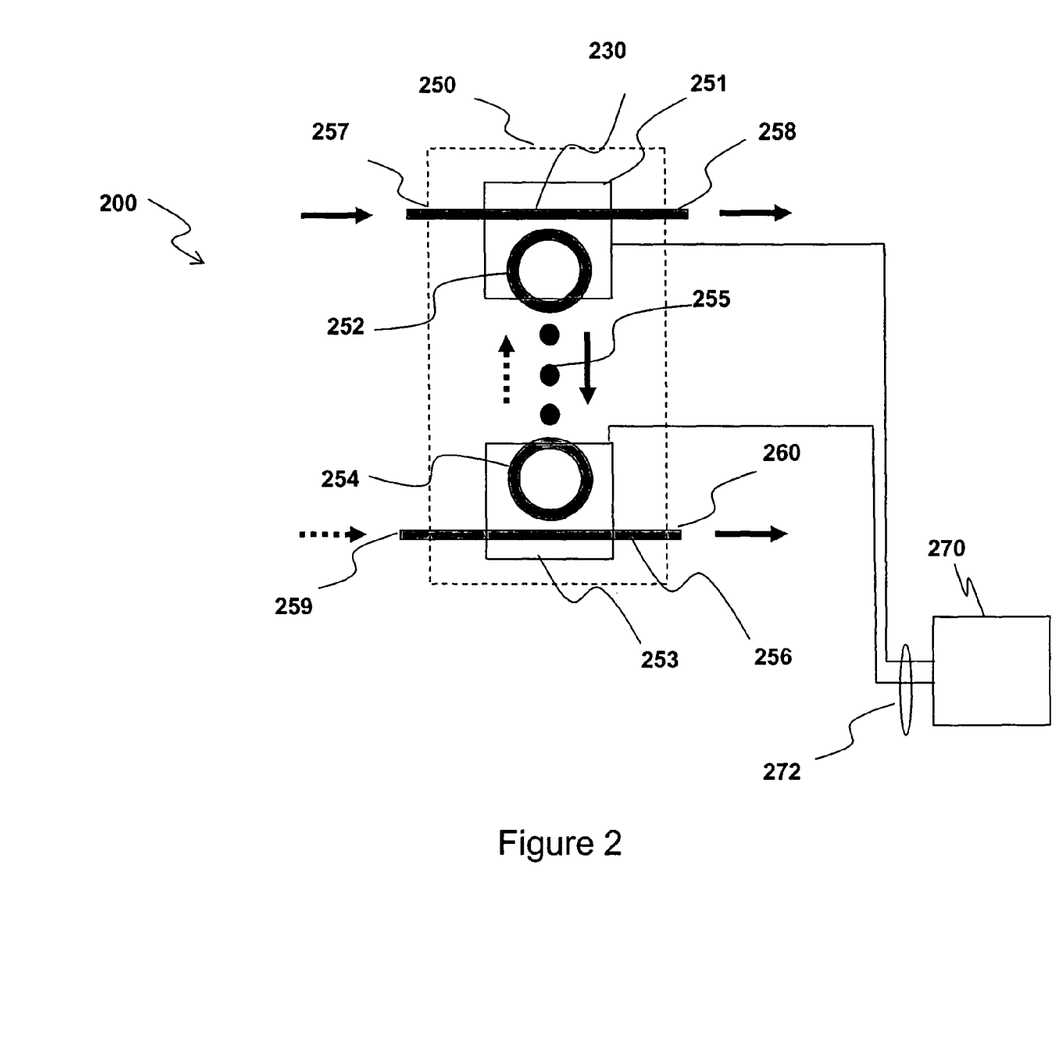
FIG. 2 is a schematic diagram showing in terms of functional blocks an embodiment of the device for tunable optical filtering according to the present invention.

FIG. 2 shows a schematic diagram of an optical device 200 in accordance with an embodiment of the present invention. The optical device 200 may be comprised within the optical processing node 150 of FIG. 1.

The design scheme of the optical device 200 according to the present invention comprises an optical filter 250 comprising an input port 257 and an output port 258. Throughout the present description, the terms 'input' and 'output' are used with reference to a conventional direction of propagation of the optical radiation (in FIG. 2 exemplarily from left to right and from top to bottom, as indicated by the solid arrows), but, when in operation, the optical radiation may propagate in the opposite direction. The optical filter 250 is adapted to receive an optical signal comprising a plurality of channels lying on a grid of optical frequencies equally spaced by a given frequency spacing and occupying an optical bandwidth via the input port 257 and to output a transformed optical signal via the output port 258 according to optical transfer functions (such as phase and power transfer functions). The optical filter 250 may be any optical device apt to give an optical transformation to the input optical signal, being its optical transfer functions wavelength-dependent in the wavelength band of interest. In the present description, any physical quantity which substantially changes within the WDM optical wavelength band of interest (e.g. 30 nm around 1550 nm) is referred to as being 'wavelength-dependent'.

Comprised within the optical filter 250, a first optical path 230, in the form of, e.g. an optical waveguide such as a planar lightguide circuit (PLC) waveguide, optically connects the input port to the output port.

According to the present invention the optical filter 250 comprises a plurality of resonant cavities (or resonators) 252, 254, 255, such as Bragg gratings or microcavities such as linear cavities, microrings, racetracks, photonic band gap cavities and the like. In a preferred configuration, the resonant optical filter 250 comprises microring or racetrack resonators. The plurality of resonators comprises a first optical resonator 252 optically coupled adjacently to the first optical path 230 and one or more further resonators 254, 255 coupled in series to said first resonator 252. In the drawings, the symbol 255 consisting in three dots vertically aligned represents an arbitrary number, including zero, of resonators. Preferably the series-coupled resonators 252, 254, 255 comprised within the optical filter 250 are less than or equal to four, more preferably they are two or three.

In general, a single resonant optical cavity has associated 'resonant wavelengths' (and corresponding 'resonant frequencies'), defined as those wavelengths which fit an integer number of times on the cavity length of the resonant optical cavity. The integer number defines the order of the resonance. For example a Bragg grating comprises a plurality of coupled resonant cavities. The distance between two adjacent resonant frequencies/wavelengths is referred to as the free spectral range (FSR) of the single resonator.

The transfer functions (e.g. phase, dispersion or power) of the above resonant optical filter 250 are typically characterized by strong wavelength dependence at and in the proximity of a resonant wavelength of one or more of its individual resonators, depending on the distribution of the resonances of the constituting individual resonators and on their reciprocal position in the frequency domain. The above perturbations of the overall transfer function are typically equally spaced in frequency and the distance between two adjacent perturbations of the optical filter 250 is referred to as the (overall) 'free spectral range' of the resonant optical filter 250. In the advantageous case wherein all the resonators comprised within the optical filter have the same FSR and their resonances are all aligned, the overall FSR of the optical filter coincides with the FSR of the single resonators and the overall resonances of the optical filter coincides with the resonances of the (aligned) resonators.

The overall FSR of the optical filter 250 may be greater or smaller than the WDM optical bandwidth.

In a preferred embodiment the optical filter 250 is an optical add and/or drop filter (OADF) wherein the two or more resonators 252, 254, 255 are optically coupled in series between the first optical path 230 and a further 'drop' waveguide 256. A further output optical port 260 ('drop port'), optically coupled to the drop waveguide has the function of dropping, fully or partially, at least an optical channel within the input optical signal. In other words, the power transfer function at the drop port 260 is typically characterized by high transmission peaks equally spaced in frequency by a quantity equal to the overall FSR of the optical filter. In an embodiment, the OADF 250 has a further input optical port 259 ('add port') which is apt to receive an optical radiation (dashed arrow) to be added to the thru optical signal at the output port 258. It is noted that in the absence of the further drop waveguide, the optical filter 250 may act as an all-pass filter. In FIG. 2 the positions of the drop and add port are those determined by an even number of resonators. In case of an odd number of resonators, the positions of the two ports may be switched.

When an optical drop filter 250 having an even number of resonators is in operation, the optical channels input into the input port 257 and having optical frequencies which match the (aligned) resonances of the resonators 252, 254, 255 are output into the drop output port 260 coupled to the second optical path 256, and they physically travel across the resonators 252, 254, 255, as indicated by the down-arrow near the microrings.

According to the present invention, the optical filter 250 is a tunable optical filter, i.e. it is apt to select an arbitrary optical channel to be filtered. This functionality may be accomplished with any technique known in the art, such as for example exploiting the thermo-optic, the electro-optic, the magneto-optic, the acousto-optic and the elasto-optic effect or by stress or MEMS actuating. In particular, at least one resonator comprised within the optical filter 250 is individually tunable differentially with respect to at least another resonator of the remaining resonators of the optical filter 250, i.e. it may be tuned with a certain degree of freedom from the tuning of the at least another resonator. In the present description, the expression 'tuning an individual resonator' means moving the resonances of the resonator in the frequency spectrum, e.g. actuating the resonator by exploiting a physical effect. Typically, the ensemble of resonances of an individual resonator moves substantially rigidly (i.e. maintaining unchanged the resonance distribution and spacing) while the resonator is being tuned.

The optical device 200 further comprises a control system 270, 272, 251, 253 operatively connected to the resonators of the optical filter 250 so as to be able to selectively tune them in accordance to the present invention.

For example, the control system may comprise a control device 270 operatively coupled, by way for example of connecting lines 272, to at least two actuators 251, 253, which in turn are operatively coupled to the plurality of resonators of the optical filter 250. The control device 270 typically includes a processor (e.g. a microprocessor) configured for implementing the methods of tunable filtering in accordance with the present invention. The control system may also include drivers (not shown) suitable to drive the actuators 251 and 253.

In one exemplary embodiment, as the one shown in FIG. 2, each individual resonator may be tuned, within a tuning range, substantially independently from the remaining resonators, by way for example of a respective actuator dedicated to each individual resonator and individually driven by the control device 270. The dedicated actuator is configured for strongly interacting with the respective associated individual resonator while interacting weakly with the remaining resonators. For example, as shown in FIG. 2, in case the tuning operation relies on the thermo-optic technique (particularly advantageous in case of silicon waveguides) a micro-heater 251, 253 may be thermally coupled to (e.g. placed above the microrings, e.g. over the $SiO_2$ upper cladding) each individual resonator 252, 254 respectively, so that it is suitable to heat ideally only the respective associated resonator (and possibly the straight bus waveguide 230 or 256 which the associated resonator may be coupled to) while being ideally thermically isolated from the others.

Figure 3:
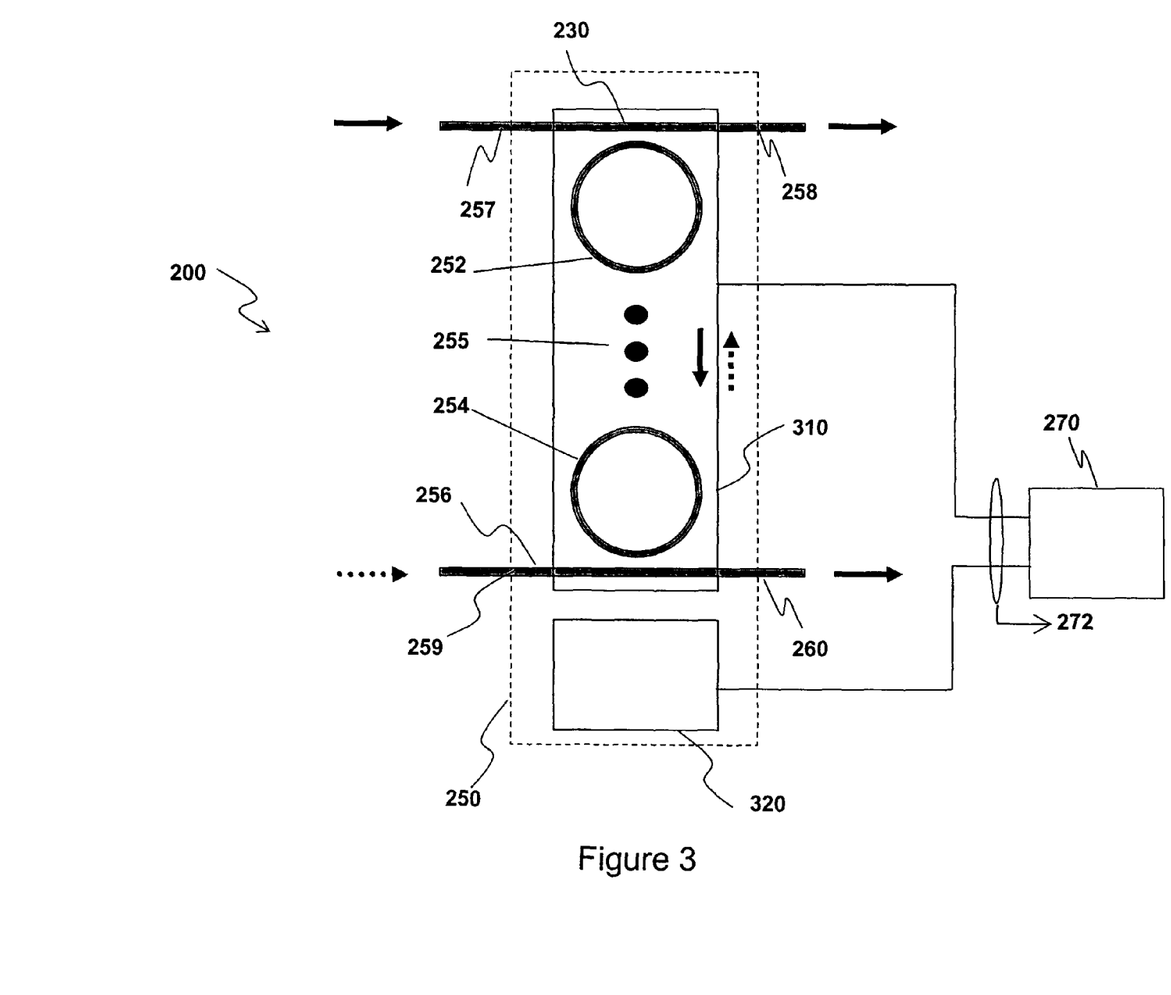
FIG. 3 is a schematic diagram showing in terms of functional blocks a further embodiment of the device for tunable optical filtering according to the present invention.

FIG. 3 shows an alternative configuration of the optical filter 250. For the sake of clarity, it is assumed that the actuators are thermo-optic actuators (i.e. micro-heaters), but the present configuration equally applies to other tuning techniques. A massive tuning heater 310 is configured for heating substantially uniformly all the resonators 252, 254 and 255 comprised within the optical filter 250. In addition, a trimming heater 320 is configured for selectively heating one or a plurality of resonators, but in any case it is configured for interacting not uniformly with the totality of the resonators in the optical filter 250. For example, the heater 320 may be placed in proximity (on the side or on top) of a single resonator 254 so as to interact with this one single resonator more strongly than with the remaining resonators. In this way a differential temperature is generated which allows differential tuning of the resonators.

The optical components described in the present description, such as the optical waveguides 230, 256 and the microrings 252, 254, 255 of FIG. 2 and FIG. 3, may be fabricated by any fabrication process known in the field of integrated optics, e.g. a layering process on a substrate, such as an SOI wafer having a thickness of the buried oxide in the range of 3-10 microns and a thickness of the top Si in the range of 50-1000 nm. The layering process may include the e-beam lithography and etching steps. A $SiO_2$ layer could be deposited as a top cladding.

In the following, a method for optical filtering according to the present invention will be described with reference to FIG. 4. This method may be implemented by operation of the scheme of the optical device 200 of FIG. 2 or 3, described above, e.g. by tuning an optical filter 250 comprising a plurality of series-coupled resonators in accordance with the present invention. Where useful for the understanding of the method of the present invention, reference will be made to elements and corresponding reference numerals of FIGS. 2 and 3, without restricting the scope of the method. The method is particularly suitable to change the filtering from an initial channel to a final channel within a plurality of WDM channels, while leaving the thru channels with a minimum alteration or no alteration at all.

Figure 4:
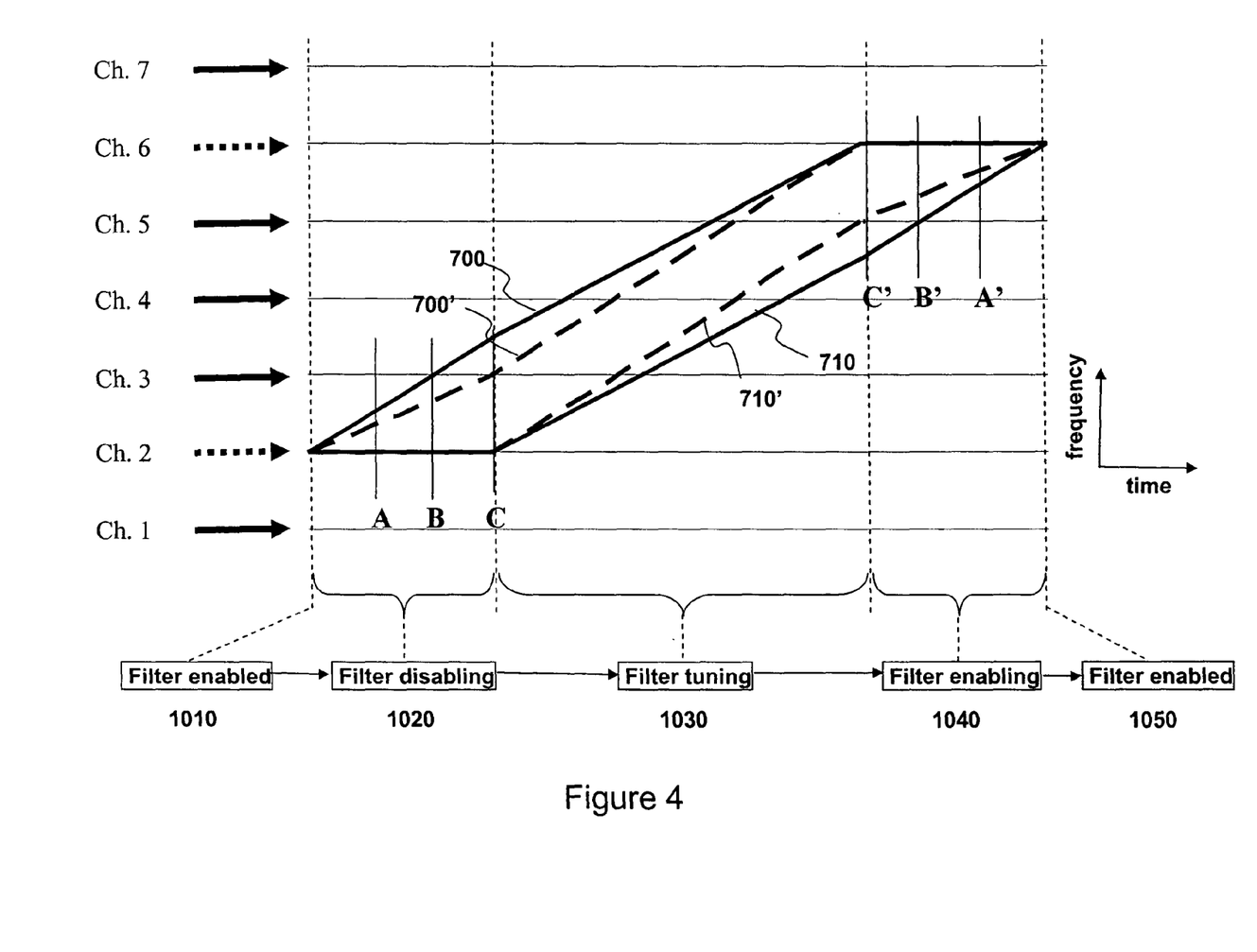
FIG. 4 shows the principal steps of an exemplary method for tuning an optical filter in accordance to the present invention.

In FIG. 4 the horizontal and vertical axis of the Cartesian graph represent respectively time and optical frequency scale. Figures from FIG. 4 to FIG. 7 show the case of an optical filter comprising two and no more than two series-coupled resonator. It is understood that the teaching of the present invention equally applies to optical filters comprising three or more series-coupled resonators.

For the sake of illustration it is assumed that the filter is tuned from an initially filtered optical channel (exemplary channel 2 represented by a dashed arrow) to a finally filtered optical channel (exemplary channel 6), passing over the intermediate thru channels (in the example channels 3, 4 and 5 represented by solid arrows). It is also assumed that the final channel has optical frequency ('final frequency') higher than that of the initial channel ('initial frequency'), even though the skilled reader would easily understand the more general case. Typically initially and finally filtered channels are switched off during tuning operation or they are let switched on but not used for communication purpose.

First (step not shown), a WDM optical signal comprising a plurality of optical channels having respective optical frequencies lying on a grid ('WDM grid') of allocated frequencies equally spaced by a given frequency spacing, said grid occupying an optical bandwidth, is received at the input port 257 of the optical filter 250.

It is noted that the WDM optical signal does not necessarily need to comprise all the channels which may occupy said grid until it is filled. Actually, one or more of the allocated frequencies of the grid may be vacant. Nevertheless, the method and device of the present invention is suitable for processing a full-grid WDM signal and the examples below will refer to this case, without limiting the scope of the invention.

In step 1010, the initial channel is filtered by way of the optical filter 250. In the initial state 1010 the filter 250 is 'enabled' which means that a respective optical resonance of each one of the plurality of resonators falls within a given frequency band, typically comprising the center optical frequency allocated for the initial WDM channel (exemplarily the channel 2), said frequency band having a bandwidth sufficiently narrow to enable, independently from the single resonator bandwidth, the filter to operate properly on the desired channel having the desired channel bandwidth (i.e. with suitable shape and dimension of the filter spectral responses as known in the art). Typically, the bandwidth is less than 15 GHz, preferably less than 10 GHz, and more preferably less than 5 GHz. This initial state may be achieved by properly tuning one or more (e.g. all) of the individual resonators. In the present description and claims, when reference is done to a position (in the frequency spectrum) or to a distance of a resonance with respect to another one, reference is done to the peak of the resonance(s) of interest.

The resonances defined above are hereinafter called 'initial resonances of interest' and their number equates the number of resonators within the filter. It is noted that typically a single resonator has a plurality of resonances characterized by their order and distributed along the frequency spectrum, typically with constant periodicity. The present invention equally holds independently by the specific order of the initial resonance of interest of each resonator. For practical reasons, it is preferable that all the above initial resonances of interest of the resonators belong to the same order. In case all the individual resonators are structurally identical (equal FSR) and thermo-optically actuated, this may be achieved, e.g., by setting all the resonators at substantially the same mean temperature ('mean temperature' is the temperature averaged along the whole length of the ring). In addition, it is noted that it is not strictly necessary that all the resonators within the plurality of resonators have the same FSR. In the preferred case of the resonators having the same FSR, the condition of step 1010 implies that each resonance of any resonator is aligned, within 15 GHz, with a respective resonance of any of the other resonators.

Subsequently to step 1010 (e.g. because of the need of changing the channel to be dropped) in step 1020 the optical filter 250 is subject to a 'disabling' step, wherein the overall filtering function of the filter is spoiled by introducing a certain separation between each resonance of at least one of the plurality of resonators falling within the optical band of interest (WDM optical bandwidth) and the respective resonance of at least another different resonator which is the resonance nearest (in the wavelength or frequency domain) to respectively said each resonance, the separation being greater than or equal to 150 GHz (see discussion below). In FIG. 4 solid curve 700 represents the trajectory (in the time-frequency plane) of the initial resonance of interest of, e.g., said at least one resonator while solid curve 710 represents the trajectory of the initial resonance of interest of said at least another different resonator. In the example of FIG. 4, only one resonance (i.e. the initial resonance of interest) of the at least one resonator falls within the WDM band and the nearest resonance of the at least another different resonator is the initial resonance of interest of the at least another resonator. In the example of FIG. 4, during disabling only the resonator 700 is tuned while resonator 710 is kept fixed. Curves 700' and 710' show a possible alternative to, respectively, curve 700 and 710. Disabling of the filter continues at least until a separation equal to 150 GHz between the two resonances is reached. However, the maximum separation reached by the two resonances during the disabling step or in the entire procedure of FIG. 4 may be, and typically is, higher than 150 GHz. In FIG. 4 the maximum separation corresponding to curves 700 and 710 is exemplarily one and half times the WDM channel spacing, while the one corresponding to curves 700', 710' is equal to one channel spacing.

Figure 5A:
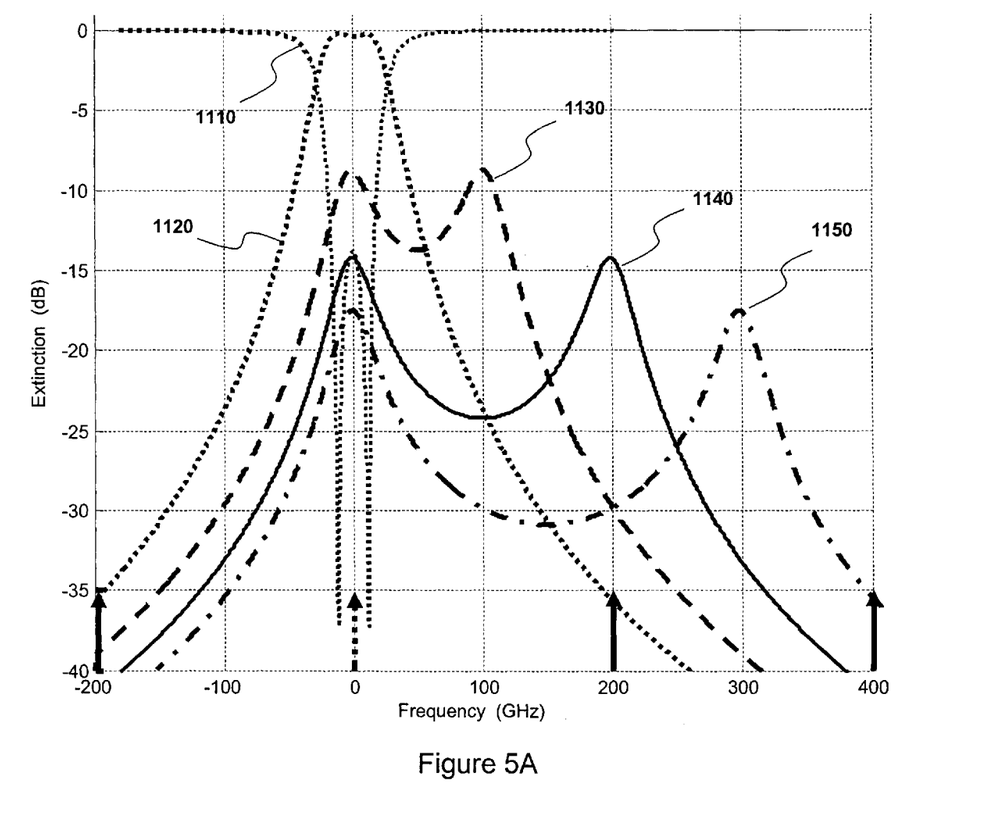
FIGS. 5A, B, C and D show the effects in terms of optical power responses of the method of FIG. 4.
Figure 5B:
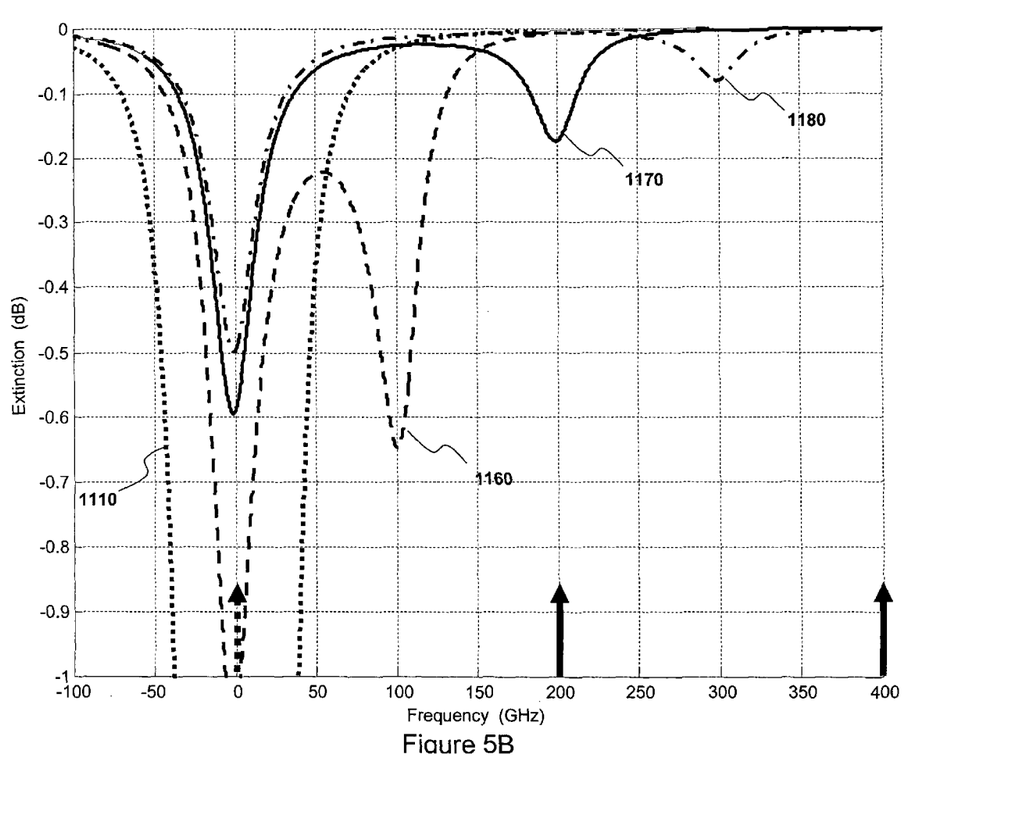

In order to illustrate the effects of step 1020, reference is done to FIGS. 5A and 5B which show thru (at port 258) and drop (at port 260) power responses of an optical drop filter 250 of the kind shown in FIG. 2 or FIG. 3 and comprising two and no more than two microring resonators 252, 254 series-coupled between the two bus-waveguides 230, 256. The microrings have the same ring radius equal to about 5 (±1%) μm and thus the same corresponding FSR equal to about 2300±20 GHz. Silicon has been selected as the core material of the waveguides constituting the optical filter 250, i.e. constituting both the resonators 252 and 254 and the optical paths 230, 256. Preferably, the purity of silicon as the core material is higher than 90% in weight, more preferably higher than 99%. The doping level of the silicon core material is preferably below $10^{15}$ defects/cm$^3$. The choice of silicon is due to its high thermo-optic effect which enables a large tuning range of the optical structures thus fabricated. For example, silicon as a core material allows for a microring resonance tuning of at least 16 nm, preferably equal to about 32 nm, with a relatively moderate range of the heater temperature, i.e. below 400° C. Silica may be used as a cladding material surrounding the silicon waveguide core, e.g. in a buried or channel or ridge waveguide configuration. Alternatively other kind of materials could be used as cladding such as: polymers, spin on glass i.e. HSQ, Si3N4, etc. The high index contrast waveguide obtained through the above material systems allows fabricating microring resonators with very small radius and negligible bending losses. Silicon waveguides height may suitably be in the range of 100-300 nm and their thickness in the range of 200-600 nm. In the example described in FIG. 5, silicon waveguide cross section (both straight bus and microring) is about 488 nm in width and 220 nm in height. The width of the section of the waveguide in proximity of the microring narrows to 400 nm wide. A SiO$_2$ top cladding with a refractive index (at a wavelength of 1550 nm and at a temperature of 25° C.) of $n_{clad}$=1.446 has been included in the design. Silicon refractive index has been taken equal to 3.476 (wavelength of 1550 nm and temperature of 25° C.). The calculated effective and group indexes of the Si waveguide were respectively in the range of about 2.43-2.48 and 4.21-4.26. The ring to bus and ring to ring power coupling coefficients are respectively 8.5% (±10%) and 0.24% (±10%), which may be exemplarily obtained by a ring to bus gap equal to 132±10 nm and a ring to ring gap equal to 260±20 nm.

In calculating the optical responses, it has been assumed a realistic value for the total propagation loss of both the substantially straight silicon waveguides (e.g. 230, 256) and of the microring waveguides 252, 254 of the order of 3 dB/cm (comparable results are obtained in a range from 2 to 5 dB/cm). In case of different values of microring losses, a proper choice of the bus-to-ring coupling coefficients may allow achieving the desired results in terms of hit losses.

A rigorous transfer matrix approach and a 3D Finite Difference Time Domain (FDTD) approach have been respectively used for the calculation of the transfer functions and of the actual dimensional layout of the optical components of the present description. Throughout the present description, the TE polarization mode has been investigated, without restricting the scope of the present invention. In particular, as regard polarization, it is noted that some optical properties of the elements (or of their parts) of the present description, such as, e.g., the resonant optical frequencies, may depend on the specific polarization mode of the optical field propagating therethrough. In the present description, when reference is done to those optical properties, it is assumed a single polarization mode. Preferably the waveguides constituting those elements or their parts are apt to propagate only one polarization (single polarization mode) or they are operated so as to propagate only one polarization (e.g. by exciting only one polarization mode).

Curve 1110 (dotted) in FIGS. 5A and 5B represents the thru power response (at thru port 258) when the optical filter is in the state according to step 1010 above, i.e. 'enabled' and tuned on a given channel (the initial channel), illustrated by the dashed arrow at conventionally zero frequency. In particular, the two respective initial resonances of interest of the two microring resonators are tuned so as to be substantially aligned, i.e. to fall within a frequency band centered on the initial channel and having bandwidth less than or equal to 10 GHz. Curve 1120 (dotted) in FIG. 5A represents the drop power response (at drop port 260) corresponding to the thru response 1110. The solid arrows represent the channels neighboring the initial channel, with an exemplary spacing of 200 GHz.

Curves 1130 (dashed), 1140 (continuous) and 1150 (dash-dotted) represent the drop response at three instants (e.g. states A, B and C with regard to curves 700 and 710 in FIG. 4) of an exemplary realization of step 1020 (either in a final or an intermediate state), wherein the separation between the respective optical resonances of the first and second resonator is respectively 100 GHz, 200 GHz and 300 GHz. Curves 1160 (dashed), 1170 (continuous) and 1180 (dash-dotted) in FIG. 5B represent the thru response corresponding to the drop responses 1130, 1140 and 1150 respectively.

FIGS. 5A and 5B show how the overall resonance and filtering function of the optical filter 250 is spoiled by mutually separating the initial resonances of interest of the first and second resonator (filter 'disabling'). In particular, the disablement shown in FIGS. 5A and 5B is obtained by leaving the resonance of the resonator coupled closest to the first optical path 230 (i.e. the input-to-thru waveguide) unperturbed, i.e. in correspondence to the initial channel, and by tuning only the resonator coupled closest to the drop waveguide 256 so as to move its respective resonance away from the resonance of the other resonator.

Once the filter is disabled, i.e. the separation is greater than 150 GHz (see discussion below), it is adapted to be massively tuned (step 1030) over the WDM band without affecting or weakly affecting the WDM channels 'crossed' by any resonance of any individual resonator of the optical filter. The expression 'massive tuning' means that all the resonances of the resonators are moved in the frequency domain by a respective frequency interval greater than the WDM frequency spacing, while maintaining a distance between the resonances separated according to the above greater than or equal to the separation achieved during the disabling step (which in turn is greater than or equal to 150 GHz).

Preferably, during massive tuning all the resonators of the filter are tuned substantially in unison (uniformly and contemporarily), i.e. the overall response functions of the optical filter rigidly move in the frequency domain. Exemplarily, in FIG. 4 and curves 700 and 710, the massive tuning is performed 'rigidly' and it ends when the resonance of one of the individual resonators is in the proximity of the central allocated WDM frequency of the final channel.

The effect of the disablement during massive tuning is derivable from FIG. 5B: the maximum power loss hit at 100 GHz, 200 GHz and 300 GHz resonance separations is respectively about 1 dB, 0.6 dB and 0.5 dB on the thru channels (channels 3, 4 and 5 of FIG. 4) 'crossed' by the resonance of interest of the ring coupled closest to the input-to-thru waveguide 230 while being tuned (assuming ring propagation loss of about 3 dB/cm). Such resonance, of interest in FIG. 5B is represented at zero frequency. It's worth to note that the drop response (FIG. 5A) is not particularly significant during massive tuning, since typically during massive tuning operations the output from the drop port is neglected.

Figure 6A:
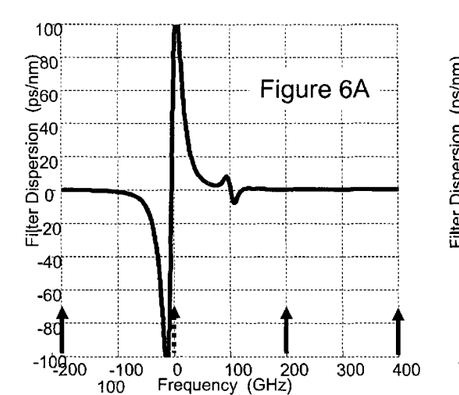
FIGS. 6A, B and C show the effects in terms of dispersion responses of the method of FIG. 4.
Figure 6B:
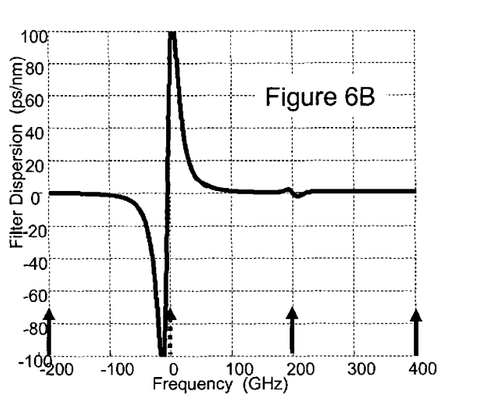
Figure 6C:
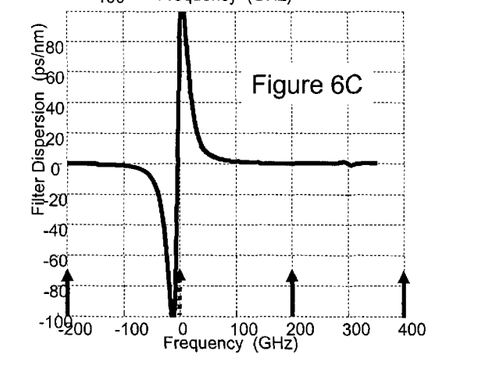

FIGS. 6A, 6B and 6C show the thru dispersion response (at thru port 258) corresponding respectively to the thru power responses 1160, 1170 and 1180 of FIG. 5B (and corresponding respectively to a resonance separation of about 100 GHz, 200 GHz and 300 GHz).

Figure 5C:
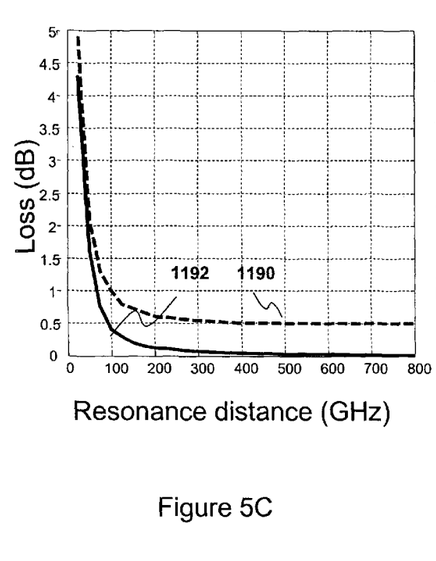

FIG. 5C shows on the horizontal axis the mutual distance (in absolute value) between the closest resonances of a two-ring optical filter and on the vertical axis the corresponding power loss at a thru optical frequency overlapping the resonance of either the ring closest to the input-to-thru waveguide (dashed curve 1190) or the ring adjacently coupled to the previous ring (continuous curve 1192). In case of a drop filter, the latter ring is the one adjacently coupled to the drop waveguide (e.g. waveguide 256 of FIG. 2 and FIG. 3).

Figure 5D:
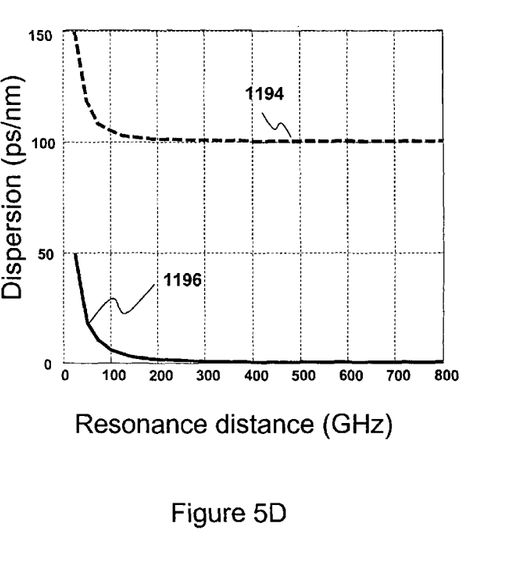

FIG. 5D correspondingly shows on the horizontal axis the mutual distance (in absolute value) between the closest resonances of a two-ring optical filter and on the vertical axis the corresponding dispersion hit at a thru optical frequency overlapping the resonance of either the ring closest to the input-to-thru waveguide (dashed curve 1194) or the ring adjacently coupled to the previous ring (continuous curve 1196).

The following table 1 shows the corresponding numerical values, wherein the second column corresponds to curve 1190, the third one to curve 1194, the fourth column to the curve 1192 and the last column to curve 1196.

TABLE 1

| Separation (GHz) | Loss ring #1 (dB) | Disp ring #1 (ps/nm) | Loss ring #2 (dB) | Disp ring #2 (ps/nm) |
| --- | --- | --- | --- | --- |
| 25 | 4.9 | 150 | 4.3 | 50 |
| 50 | 2.1 | 118 | 1.6 | 18 |
| 75 | 1.3 | 108 | 0.75 | 10.5 |
| 100 | 1 | 105 | 0.4 | 6 |
| 125 | 0.8 | 103 | 0.3 | 4 |
| 150 | 0.72 | 102 | 0.2 | 2.5 |
| 175 | 0.66 | 101.5 | 0.15 | 2 |
| 200 | 0.61 | 101.2 | 0.12 | 1.5 |
| 300 | 0.55 | 100.5 | 0.06 | 0.65 |
| 400 | 0.51 | 100 | 0.035 | 0.4 |
| 500 | 0.5 | 100 | 0.02 | 0.26 |
| 600 | 0.5 | 100 | 0.015 | 0.2 |
| 800 | 0.5 | 100 | 0.01 | 0.15 |

The technical specifications which according to the Applicant are acceptable for a hit-less tunable OADM filter, are simultaneously the following:

1. the extra loss (loss hit) suffered by any of the thru channels during filter massive tuning less than or equal to the loss uniformity requirement, i.e. less than or equal to about 0.5 dB.
2. the extra dispersion (dispersion hit in absolute value) induced on the thru channels during filter massive tuning lower than about 150 ps/nm (better 100 ps/nm).

It is noted that although the specification on the maximum extra dispersion of the thru channels for a generic tunable OADM is commonly +/−20 ps/nm (being that it may be possible to cascade up to 16 OADMS in a telecommunication link while maintaining the accumulated dispersion below about 320 ps/nm), nevertheless during the transient time of the tuning procedure (i.e. over some tenths of milliseconds) an extra dispersion up to 100-150 ps/nm can be tolerated without significantly affecting the transmission performances.

The Applicant has found that when the detuning is less than about 125 GHz (1 nm), the maximum loss at a frequency matching the resonance of the ring adjacently coupled to the input-to-thru waveguide is greater than about 0.8 dB and the dispersion larger than about 105 μs/nm. The Applicant has also found that it is possible to mitigate such large hits by increasing the mutual resonance distance, as becomes now clear from Table 1 and FIGS. 5C and 5D. Accordingly, the Applicant has found that it is preferable to maintain the relative distance between the respective resonances of a first and a second resonator within the optical filter of the invention during massive tuning of the filter at a value greater than or equal to 150 GHz, so as to obtain a maximum loss on the thru channels less than about 0.8 dB. More preferably, such resonance distance is greater than or equal to 200 GHz, in order to mitigate the hit at a value less than or equal to 0.6 dB. Even more preferably, the resonance distance is greater than or equal to 300 GHz, corresponding to a hit no more than about 0.5 dB. Further more preferably, when the separation is greater than or equal to 400 GHz (3.2 nm in the near infrared band), the extra loss on thru channels during massive tuning of the filter is less than or equal to about 0.5 dB and the extra dispersion less than or equal to 100 µs/nm. The above values of the loss and dispersion hit depend on the structure, materials and parameters exemplarily used above.

In addition to the above, the Applicant has found that while increasing the mutual distance of the resonances using the thermo-optic effect, a trade-off exists between the consequent decrease of power and dispersion hit and the increase of the thermal cross talk. In fact, the difference in the resonance position corresponds to a difference in the thermal state of the at least two rings of interest, i.e. a difference in the ring mean temperature. For a given resonance separation, a corresponding difference of the ring mean temperatures exists, which depends on the structure and material of the rings. For example, for a two-ring silicon filter as described above, a resonance separation of about 800 GHz and 400 GHz corresponds to a difference in the ring mean temperature of respectively about 80° C. and about 40° C., roughly speaking. In turn, for a given difference in the ring mean temperature a corresponding thermal cross-talk exists, i.e. a certain amount of thermal energy flows from the hotter ring to the cooler one and/or from the heater heating the respective ring to the other (unwanted) ring. Again, the thermal cross-talk will depend on the choice of materials and structures of the rings and their coupling region, on the thermal isolation among the two rings and on the structure, layout and thermal coupling of the respective heaters. In general, for a given target difference in the ring mean temperature to be maintained, the higher is the thermal cross-talk, the higher is the difference in the heat radiated by the two heaters associated to the two rings and consequently the higher is the total power consumption. Since typically the higher is the difference in the heat radiated by the two heaters the higher is also the difference in the temperatures of the two heaters, this results also in a higher thermal wear and tear.

Accordingly, the Applicant has found that it is advantageous to keep the resonance separation less than or equal to about 1000 GHz, more preferably less than or equal to about 8.00 GHz, even more preferably less than or equal to about 600 GHz. These maximum values are consistent with the fact that, as now clear from Table 1, FIGS. 5C and 5D, the loss and dispersion hits asymptotically tend to fixed values (exemplarily about 0.5 dB loss and 100 µs/nm dispersion hits).

Referring now back to FIG. 4, in step 1040 the filter is enabled again, so that, once enabled (state 1050), a respective optical resonance of each one of the plurality of resonators falls within a frequency band, having the bandwidth described above for the initial frequency band and typically comprising the center optical frequency allocated for the final WDM channel (exemplarily channel 6).

The resonances defined above are hereinafter called 'final resonances of interest' and their number equates the initial resonances of interest. While in FIG. 4 the initial and final channels are filtered by way of the same resonances of the two rings translated in frequency (i.e. the final resonances of interest have the same order of the initial resonances of interest), in another embodiment the order of the final resonances of interest, at least of one or more of the plurality of resonators, may be different from that of the initial resonances of interest.

The 'enabling' step 1040 may be performed by replicating back the same steps followed for filter disabling 1020 with the role of the two rings of interest mutually exchanged, as shown in FIG. 4. With reference to FIG. 4, exemplarily the resonance of said at least one resonator (curve 700 or 700') is maintained at the target frequency while the resonance of said at least another different resonator (curve 710 or 710') is moved toward the target frequency, so as to pass through states C', B' and A' respectively corresponding to states C, B and A.

The specific starting and ending points of the dynamic steps 1020, 1030 and 1040 shown in FIG. 4 are purely conventional and for illustrative purpose only. This is particularly true when determining the boundaries between filter disabling and filter tuning and between filter tuning and filter enabling. Conventionally, the ending point of the disabling step (which coincides with the starting point of the tuning step) may be taken at the instant when the separation between the resonances of interest reaches a given predetermined value, which in any case needs to be not less than 150 GHz. Similarly, the starting point of the enabling step may be taken at the instant when the separation between the resonances of interest goes below a further given predetermined value, which may be equal to the predetermined value above or different, but in any case not less than 150 GHz. Exemplarily, in FIG. 4 the end of disablement and the start of enablement both are conventionally taken at one and half times the WDM channel spacing for curves 700 and 710, while for curves 700', 710' they are at one the channel spacing. However, the position in time of the end and start points above changes while changing the above predetermined value(s).

In the example shown in FIG. 4 the resonance of interest of both the at least one resonator (curve 700) and the at least another resonator (curve 710) 'hits' successively the thru channel numbered 3, 4; and 5, for a total number of six hits. For example, assuming a channel spacing equal to 100 GHz and assuming that curve 700 represents the ring series-coupled to the ring adjacently coupled to the input-to-thru waveguide, then the power hit on channel 3 in the state B is equal to about 0.4 dB (see Table 1 and FIG. 5C) and the subsequent hits on channel 4 and 5 is equal to about 0.2 dB. As regard to curve 710 (ring closest to the input-to-thru waveguide) the hits during massive tuning on channel 3 and 4 is equal to about 0.7 dB, while the hit in the state B' on channel 5 is about 1 dB.

Figure 7:
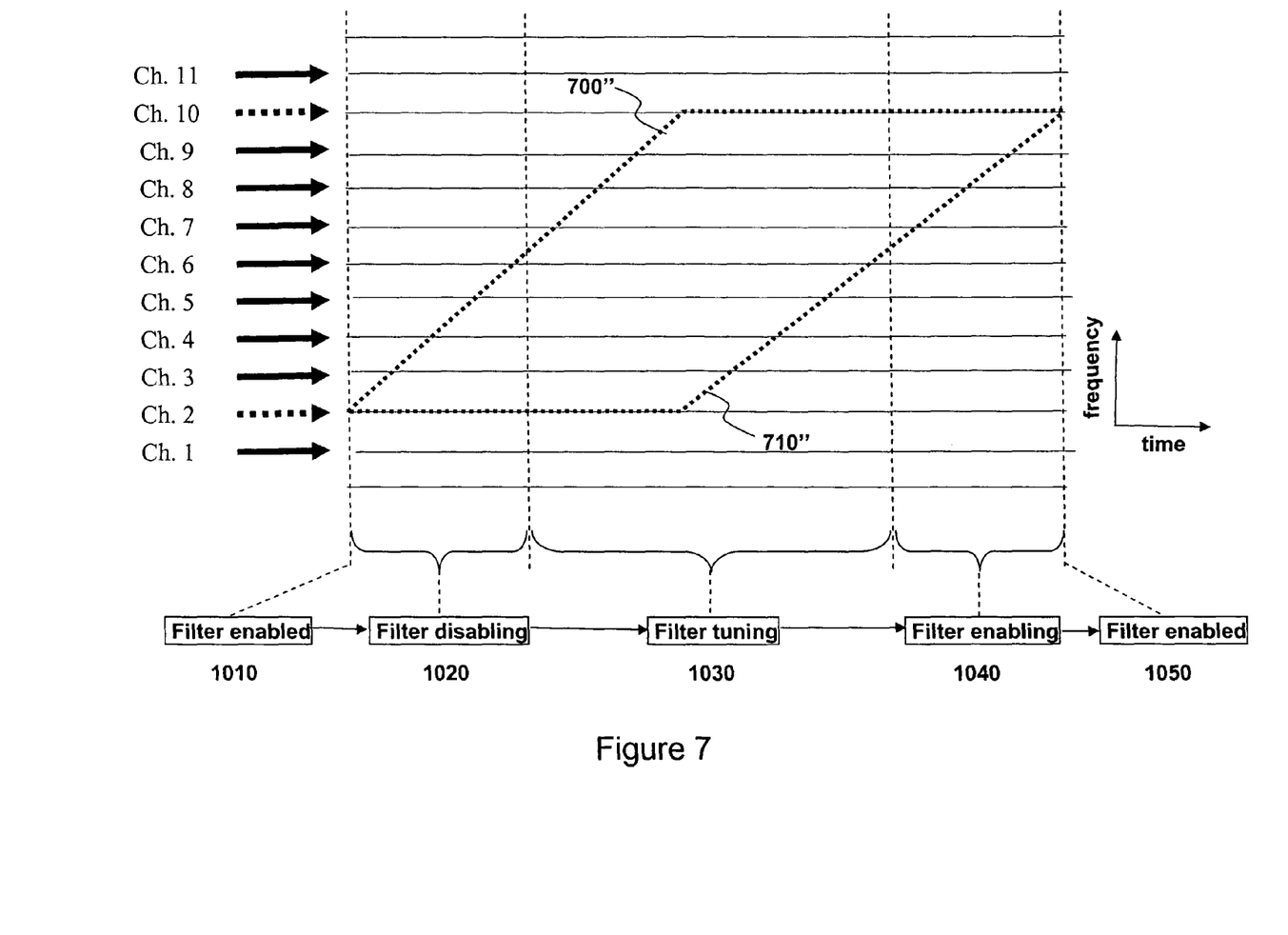
FIG. 7 shows a comparative example of a method for tuning an optical filter.

In FIG. 7 a comparative example is shown, wherein it is now assumed that the finally filtered channel is the tenth channel. In case the frequency spacing is about 200 GHz, the distance between the initial and final channel (range to be spanned during tuning of the filter) is about 1.6 THz. Curve 700" and 710" have the same meaning of, respectively, curve 700 and 710 of FIG. 4.

Exemplarily, the filter disablement is assumed to end at a resonance separation of about 900 GHz and the filter enablement to start at a resonance separation of about 700 GHz. However, the pattern of the filter massive tuning results in a resonance separation of about 1.6 THz, which give rise to serious practical problems due to the thermal cross, both in achieving such a large separation and in the power consumption as explained above.

Although the present invention has been disclosed and described by way of some embodiments, it is apparent to those skilled in the art that several modifications to the described embodiments, as well as other embodiments of the present invention are possible without departing from the essential features thereof/the scope thereof as defined in the appended claims.

The invention claimed is:

1. A method for filtering an optical signal comprising a plurality of channels lying on a grid of optical frequencies equally spaced by a frequency spacing and occupying an optical bandwidth, the method comprising:

operating an optical filter comprising resonators, each resonator having a respective free spectral range, wherein a first resonator is optically coupled to the optical signal and the remaining one or more resonators are optically coupled in series to the first resonator, so that a respective resonance of each one of the resonators falls within a first frequency band having bandwidth less than or equal to 15 GHz;

first tuning at least one resonator with respect to at least another resonator to obtain a separation between any resonance of at least one resonator falling within the optical bandwidth with respect to a resonance of at least another resonator nearest to the any resonance, the separation being greater than or equal to 150 GHz and no more than 1 THz;

second tuning all the resonators of the optical filter so as to move all respective resonances of the resonators by a respective frequency interval greater than the frequency spacing while maintaining a distance between the any resonance of the at least one resonator with respect to the nearest resonance of the at least another resonator not less than 150 GHz and no more than 1 THz; and third tuning the at least one resonator and the at least another resonator such that a further respective resonance of each one of the resonators falls within a second frequency band, different from the first frequency band, having bandwidth less than or equal to 15 GHz.

2. The method of claim 1, wherein the optical filter is operated by tuning at least one resonator of the optical filter differentially from the remaining one or more resonators.

3. The method of claim 1, wherein during second tuning all the resonators are tuned so that the distance between the any resonance of the at least one resonator falling within the optical bandwidth with respect to the respectively nearest resonance of the at least another resonator is maintained in a range from half of the separation to one and half of the separation.

4. The method of claim 1, wherein in during second tuning all the resonators are tuned so that the distance between the any resonance of the at least one resonator falling within the optical bandwidth with respect to the respectively nearest resonance of the at least another resonator is maintained in a range from 90% of the separation to 110% of the separation.

5. The method of claim 4, wherein during second tuning all the resonators are tuned substantially in unison so as to equally and contemporarily move all the respective resonances of the resonators.

6. The method of claim 1, wherein the resonators of the optical filter are optically coupled in series between a first optical path propagating the optical signal and a second optical path.

7. The method of claim 1, wherein the separation in the first tuning and the distance in the second tuning both are greater than or equal to 300 GHz.

8. The method of claim 1, wherein the separation in the first tuning and the distance in the second tuning both are less than or equal to 800 GHz.

9. The method of claim 1, wherein the frequency spacing is greater than or equal to 50 GHz.

10. The method of claim 1, wherein a first channel belonging to the optical signal at least partially overlaps the first frequency band and a second channel belonging to the optical signal at least partially overlaps the second frequency band.

11. The method of claim 10, wherein a distance between the first optical channel and the second optical channel is greater than or equal to about 1 THz.

12. The method of claim 1, wherein during the third tuning the further respective resonance of each one of the resonators is respectively coincident with the respective resonance of each one of the resonators.

13. An optical device comprising:
an optical filter having:
an input port for receiving an optical signal comprising a plurality of channels lying on a grid of optical frequencies equally spaced by a frequency spacing and occupying an optical bandwidth and an output port;
a first optical path optically connecting the input port to the output port; and
resonators each having a respective free spectral range, wherein a first resonator is optically coupled to the first optical path and the remaining one or more resonators are optically coupled in series to the first resonator; and a control system operatively connected to the resonators of the optical filter, the control system configured to:
operate the optical filter so that a respective resonance of each one of the resonators falls within a first frequency band having bandwidth less than or equal to 15 GHz;
first tune at least one resonator with respect to at least another resonator to obtain a separation between any resonance of at least one resonator falling within the optical bandwidth with respect to a resonance of at least another resonator nearest to the any resonance, the separation being greater than or equal to 150 GHz and no more than 1 THz;
second tune all the resonators of the optical filter so as to move all respective resonances of the resonators by a respective frequency interval greater than the frequency spacing while maintaining a distance between the any resonance of the at least one resonator falling within the optical bandwidth with respect to the respectively nearest resonance of the at least another resonator not less than 150 GHz and no more than 1 THz; and
third tune the at least one resonator and the at least another resonator such that a further respective resonance of each one of the resonators falls within a second frequency band, different from the first frequency band, having bandwidth less than or equal to 15 GHz.

14. The device of claim 13, wherein the control system is configured to tune at least one resonator of the optical filter differentially from the remaining resonators.

15. The device of claim 13, wherein during a period when the control system second tunes, all the resonators are tuned so that the distance between the any resonance of the at least one resonator falling within the optical bandwidth with respect to the respectively nearest resonance of the at least another resonator is maintained in a range from half of the separation to one and half of the separation.

16. The device of claim 13, wherein during a period when the control system second tunes, all the resonators are tuned so that the distance between the any resonance of the at least one resonator falling within the optical bandwidth with respect to the nearest resonance of the at least another resonator is maintained in a range from 90% of the separation to 110% of the separation.

17. The device of claim 16, wherein during a period when the control system second tunes, all the resonators are tuned substantially in unison so as to equally and contemporarily move all the respective resonances of the resonators.

18. The device of claim 13, wherein the resonators of the optical filter are optically coupled in series between the first optical path and a second optical path.

19. The device of claim 13, wherein the further respective resonance of each one of the resonators is respectively coincident with the respective resonance of each one of the resonators.

20. An optical communication system comprising:
a transmitter;
a receiver;
an optical line optically connecting the transmitter and the receiver; and
an optical device coupled along the optical line, the optical device comprising:
an optical filter having:
an input port for receiving an optical signal comprising a plurality of channels lying on a grid of optical frequencies equally spaced by a frequency spacing and occupying an optical bandwidth and an output port;
a first optical path optically connecting the input port to the output port; and
resonators each having a respective free spectral range, wherein a first resonator of is optically coupled to the first optical path and the remaining one or more resonators are optically coupled in series to the first resonator; and
a control system operatively connected to the resonators of the optical filter, the control system configured to:
operate the optical filter so that a respective resonance of each one of the resonators falls within a first frequency band having bandwidth less than or equal to 15 GHz;
first tune at least one resonator with respect to at least another resonator to obtain a separation between any resonance of at least one resonator falling within the optical bandwidth with respect to a resonance of at least another resonator nearest to the any resonance, the separation being greater than or equal to 150 GHz and no more than 1 THz;
second tune all the resonators of the optical filter so as to move all respective resonances of the resonators by a respective frequency interval greater than the frequency spacing while maintaining a distance between the any resonance of the at least one resonator falling within the optical bandwidth with respect to the respectively nearest resonance of the at least another resonator not less than 150 GHz and no more than 1 THz; and
third tune the at least one resonator and the at least another resonator such that a further respective resonance of each one of the resonators falls within a second frequency band, different from the first frequency band, having bandwidth less than or equal to 15 GHz.

* * * * *